Sept. 20, 1949.  E. R. BENNETT  2,482,315
FISH KEEPER
Filed July 3, 1947
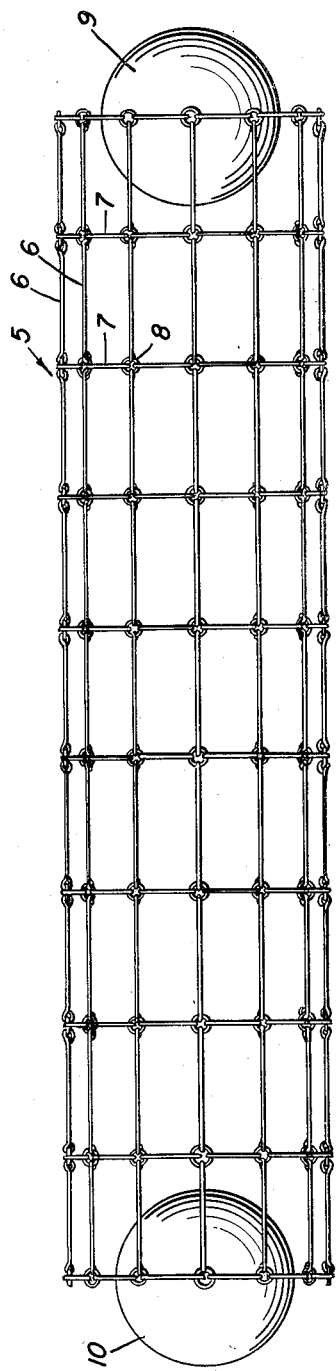
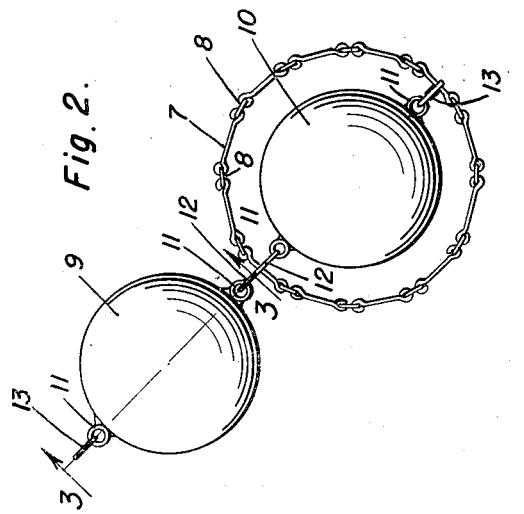
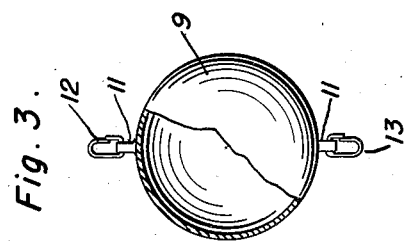
Inventor
Ernest R. Bennett
By Clarence A. O'Brien
and Harvey B. Jacobson
Attorneys

Patented Sept. 20, 1949

2,482,315

UNITED STATES PATENT OFFICE 2,482,315

FISH KEEPER

Ernest R. Bennett, Dumas, Tex.

Application July 3, 1947, Serial No. 758,900

2 Claims. (Cl. 43—55)

The present invention relates to a live fish trap and keeper which is particularly adapted for use by fishermen, the same being adapted to cage and satisfactorily hold fish as they are caught and taken off the line.

Needless to say, I am aware that all sorts of makeshift receptacles are used by anglers and fishermen, such as bags, baskets and whatnot, and these are hung or suspended overboard and thus submerged in the water to retain the fishes in live form as long as possible and before departing from the fishing ground. Also, many types of stringers and equivalent appliances and equipment are used for equivalent purposes. The present invention has to do with a simple and inexpensive collapsible cage, this of an openwork type, the same being open at opposite ends, said open ends being partially closed by buoyant balls, said balls constituting not only closures but floats for suspending the cage-like keeper in the water.

Another object of the invention is to provide a net-like cage or keeper for live fish such as will afford the fish facilities to do a certain amount of swimming within the cage, said cage being held in a somewhat horizontal position by the float forming balls.

It is a matter of common knowledge that hampers and creels, which are many times used for similar purposes, promote unpleasant odors, and due to the nature of their construction, they are likewise unpleasant to handle when being transported from place to place. So, it is another object of the invention to provide a meritorious open cage-type keeper which is less likely to promote unpleasant fishy and equivalent odors.

It is also an object of the invention to detachably connect the enclosing balls with the open ends of the cage and to make the cage of a plurality of hingedly and pivotally connected links, whereby the entire cage, when the balls are removed, may be collapsed into compact form for convenient handling and carrying.

Other objects and advantages will become more readily apparent from the following description and the accompanying illustrative drawing.

In the drawing, wherein like numerals are employed to designate like parts throughout the views:

Figure 1 is an elevational view of an open net-type cage or keeper for fishes, the same including the aforementioned float-forming and enclosing balls;

Figure 2 is an end elevation showing one ball in closed position at one end and the ball at the near end swung to open position; and Figure 3 is a fragmentary elevational and sectional view of one of the balls, the view being on the line 3—3 of Figure 2.

Referring now to the drawing by distinguishing reference numerals, the net-like or openwork cage or keeper is denoted, as a unit, by the numeral 5. Any sort of an elongated net of tubular form may be utilized. In the drawing I have employed one which is constructed of a multiplicity of rigid wire pieces of comparatively short lengths, said wire pieces being longitudinally arranged as at 6 and transversely arranged as at 7. The respective lengthwise and crosswise wires are formed into eyes and the eyes are interconnected by rings 8. The making of open and net-like mats is commonly accomplished in the style and form just described. I do not claim to be the inventor of an openwork structure but desire to use a compact, convenient and collapsible cage preferably of sufficient strength to accomplish my purposes. If cord or rope are preferred as constructional elements, they may well be used instead of wires.

In order to differentiate same, I desire to refer to the float and closure-forming balls by the numerals 9 and 10, respectively. The balls are of a diameter less than the expanded diameter of the cage when the cage is in distended form. The diameter is such that the ball serves as a closure for the coacting end but does not wholly close in the opening which surrounds the peripheral surface of the ball. The approximate proportions between ball and cage are disclosed, for example, in Figures 1 and 2, particularly Figure 2. Each ball is the same and preferably constructed from plastic to provide desired buoyancy. At diametrically opposite points eyes 11 are embedded in the ball. Then and in addition, snap fasteners or equivalent link-like fasteners 12 and 13 are provided and these fasteners are in turn adapted to be fastened to the links or parts which go to make up the cage construction.

When the balls are detached from the respective ends the wires and elements which go to make up the cage literally "fall" and thus provide a collapsed package. The latter is sufficiently compact in form, when thus flattened out, to be conveniently stored and carried in such receptacle as may be provided therefor by fishermen and others.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A fish keeper of the class described comprising an open-ended, substantially cylindrical openwork cage, buoyant balls fitted in the open ends of the cage, said balls being of diameters slightly less than the diameter of said cage, constituting floats and also functioning as closures for the ends of said cage.

2. A fish keeper of the class described comprising a cage of elongated form to accommodate fish and to submerge same below the surface of a body of water for preserving the fish for a limited time, said cage being made up of a plurality of longitudinal and transverse inter-linked elements, said cage being open at opposite ends, and buoyant balls fitted removably into the open ends, each ball having diametrically opposite eyes, and snap fasteners connected with said eyes and also connected with adjacent members of said cage.

ERNEST R. BENNETT.

REFERENCES CITED

The following references are of record in the file of this patent:

UNITED STATES PATENTS

| Number | Name | Date |
|---|---|---|
| 108,553 | Beck | Oct. 25, 1870 |
| 179,490 | Sander | July 4, 1876 |
| 268,558 | Small | Dec. 5, 1882 |
| 316,775 | Hardman | Apr. 28, 1885 |
| 611,753 | Hoskins | Oct. 4, 1898 |
| 1,072,398 | Langley | Sept. 2, 1913 |
| 1,193,684 | Gregory et al. | Aug. 8, 1916 |

FOREIGN PATENTS

| Number | Country | Date |
|---|---|---|
| 453,691 | Great Britain | Sept. 16, 1936 |